United States Patent
Cantley et al.

(10) Patent No.: US 10,437,880 B2
(45) Date of Patent: Oct. 8, 2019

(54) ARCHIVE VALIDATION SYSTEM WITH DATA PURGE TRIGGERING

(71) Applicant: BANK OF AMERICA CORPORATION, Charlotte, NC (US)

(72) Inventors: Kerry M. Cantley, Fort Mill, SC (US); Shawn Cart Gunsolley, Charlotte, NC (US); Erin Cassell, Charlotte, NC (US); Jeffrey R. Goertz, Liberty, MO (US); Geoffrey Reed Williams, Midlothian, TX (US); Deborah A. Copes, Wethersfield, CT (US); Carl Parziale, Charlotte, NC (US); Emily Brooke Gillespie, Charlotte, NC (US); David Jacob Feezor, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 407 days.

(21) Appl. No.: 15/018,241

(22) Filed: Feb. 8, 2016

(65) Prior Publication Data

US 2017/0228397 A1 Aug. 10, 2017

(51) Int. Cl.
*G06F 16/583* (2019.01)
*G06K 9/00* (2006.01)
(Continued)

(52) U.S. Cl.
CPC ........ *G06F 16/5846* (2019.01); *G06F 16/113* (2019.01); *G06F 16/125* (2019.01);
(Continued)

(58) Field of Classification Search
CPC ................. G06Q 40/02; G06Q 20/042; G06F 17/30253; G06F 17/30309;
(Continued)

(56) References Cited

U.S. PATENT DOCUMENTS 3,555,349 A  1/1971 Munz
3,555,988 A  1/1971 Wagner
(Continued)

FOREIGN PATENT DOCUMENTS

CN  1492338 A  4/2004
CN  1885341 A  12/2006
(Continued)

OTHER PUBLICATIONS

Canadian Office Action dated Oct. 30, 2012 for Application No. 2,546,849.
(Continued)

*Primary Examiner* — David T. Brooks
(74) *Attorney, Agent, or Firm* — Michael A. Springs; Moore & Van Allen PLLC; Nicholas C. Russell

(57) ABSTRACT

Embodiments of the invention include systems, methods, and computer-program products for a feedback loop for enhancing archive validation and retention parameter determination for documents. The system may generate or receive image documents. Utilizing image quality and data storage metrics the system may trigger the purging and/or retention of documents in image and/or paper form. Upon retention, the system may continually monitor the documents and store metadata associated with the use of the retained documents. Once the documents are purged, the system compiles historic data points associated with the image quality and data storage metrics. Furthermore, the system extracts the metadata associated with the monitoring of retained documents. These data points and metadata are reviewed to provide revisions in retention parameters for specific documents. A feedback loop directly communicates and integrates the revisions to the metric and criteria for instant integration.

18 Claims, 9 Drawing Sheets

(51) Int. Cl.
*G06Q 40/02* (2012.01)
*G06Q 20/04* (2012.01)
*G06F 16/11* (2019.01)
*G06K 9/03* (2006.01)
*G06F 16/93* (2019.01)

(52) U.S. Cl.
CPC ............ *G06F 16/583* (2019.01); *G06F 16/93* (2019.01); *G06K 9/00456* (2013.01); *G06K 9/036* (2013.01); *G06Q 20/042* (2013.01); *G06Q 40/02* (2013.01)

(58) Field of Classification Search
CPC ........... G06F 17/30256; G06F 16/5846; G06F 16/113; G06F 16/125; G06F 16/583; G06F 16/93; G06K 9/00456; G06K 9/00469; G06K 9/036
USPC ................................ 707/662, 663, 665, 666
See application file for complete search history.

(56) References Cited

U.S. PATENT DOCUMENTS

| | | |
|---|---|---|
| 3,556,050 A | 1/1971 | Trachtenberg et al. |
| 3,558,810 A | 1/1971 | Cecchin |
| 3,560,739 A | 2/1971 | Wolff |
| 3,561,432 A | 2/1971 | Yamaki et al. |
| 3,564,133 A | 2/1971 | Hobrough |
| 3,564,266 A | 2/1971 | Klotz, Jr. |
| 3,566,139 A | 2/1971 | Hardy et al. |
| 3,567,856 A | 3/1971 | Nezu |
| 3,571,527 A | 3/1971 | Becker et al. |
| 3,572,924 A | 3/1971 | Matsumoto et al. |
| 3,576,392 A | 4/1971 | Hofstein |
| 3,576,999 A | 5/1971 | Blythe et al. |
| 3,578,857 A | 5/1971 | Busch |
| 3,584,148 A | 6/1971 | Flory |
| 3,584,931 A | 6/1971 | Doring |
| 3,585,283 A | 6/1971 | Graser, Jr. |
| 3,586,765 A | 6/1971 | Jirka |
| 3,592,535 A | 7/1971 | Gerry |
| 3,592,548 A | 7/1971 | Majkowski |
| 3,614,309 A | 10/1971 | Presti |
| 3,614,764 A | 10/1971 | Kolb et al. |
| 3,615,540 A | 10/1971 | Land et al. |
| 3,619,052 A | 11/1971 | Diachuk et al. |
| 3,619,060 A | 11/1971 | Johnson |
| 3,620,729 A | 11/1971 | Somerset et al. |
| 3,622,224 A | 11/1971 | Wysocki et al. |
| 3,627,918 A | 12/1971 | Redpath |
| 3,630,623 A | 12/1971 | Schirmer |
| 3,632,181 A | 1/1972 | Lee |
| 3,635,139 A | 1/1972 | Guite, Sr. |
| 3,636,845 A | 1/1972 | Harvey |
| 3,643,017 A | 2/1972 | Pekau |
| 3,643,019 A | 2/1972 | Beltz |
| 3,646,256 A | 2/1972 | Jacob et al. |
| 3,647,289 A | 3/1972 | Weber |
| 3,647,290 A | 3/1972 | Egnaczak et al. |
| 3,647,441 A | 3/1972 | Bachelder |
| 3,648,388 A | 3/1972 | Lowell et al. |
| 3,648,584 A | 3/1972 | Eacock |
| 3,652,164 A | 3/1972 | Faramarzpour et al. |
| 3,654,707 A | 4/1972 | Roberts |
| 3,656,427 A | 4/1972 | Foley |
| 3,659,159 A | 4/1972 | Nagata |
| 3,661,457 A | 5/1972 | Frech |
| 3,661,577 A | 5/1972 | Klemm et al. |
| 3,737,628 A | 6/1973 | Azure, Jr. |
| 3,778,595 A | 12/1973 | Hatanaka et al. |
| 4,417,136 A | 11/1983 | Rushby et al. |
| 4,523,330 A | 6/1985 | Cain |
| 4,555,617 A | 11/1985 | Brooks et al. |
| 5,007,100 A | 4/1991 | D'Aoust et al. |
| 5,182,656 A | 1/1993 | Chevion et al. |
| 5,257,328 A | 10/1993 | Shimizu |
| 5,359,667 A | 10/1994 | Borowski et al. |
| 5,453,601 A | 9/1995 | Rosen |
| 5,600,574 A | 2/1997 | Reitan |
| 5,631,984 A | 5/1997 | Graf et al. |
| 5,678,046 A | 10/1997 | Cahill et al. |
| 5,679,940 A | 10/1997 | Templeton et al. |
| 5,687,250 A | 11/1997 | Curley et al. |
| 5,740,271 A | 4/1998 | Kunkler et al. |
| 5,754,673 A | 5/1998 | Brooks et al. |
| 5,774,249 A | 6/1998 | Shiraishi et al. |
| 5,848,400 A | 12/1998 | Chang |
| 5,917,965 A | 6/1999 | Cahill et al. |
| 5,940,844 A | 8/1999 | Cahill et al. |
| 5,963,659 A | 10/1999 | Cahill et al. |
| 6,076,074 A | 6/2000 | Cotton et al. |
| 6,097,834 A | 8/2000 | Krouse et al. |
| 6,115,509 A | 9/2000 | Yeskel |
| 6,122,625 A | 9/2000 | Rosen |
| 6,181,814 B1 | 1/2001 | Carney |
| 6,181,837 B1 | 1/2001 | Cahill et al. |
| 6,351,553 B1 | 2/2002 | Hayosh |
| 6,574,377 B1 | 6/2003 | Cahill et al. |
| 6,658,393 B1 | 12/2003 | Basch et al. |
| 6,671,795 B1 | 12/2003 | Marr et al. |
| 6,697,512 B2 | 2/2004 | Simonoff |
| 6,775,422 B1 * | 8/2004 | Altman ................... G06F 16/93 382/305 |
| 6,845,366 B1 | 1/2005 | Hassanein et al. |
| 6,886,136 B1 | 4/2005 | Zlotnick et al. |
| 6,903,767 B2 | 6/2005 | Robins et al. |
| 6,913,260 B2 | 7/2005 | Maier et al. |
| 7,082,216 B2 | 7/2006 | Jones et al. |
| 7,092,560 B2 | 8/2006 | Jones et al. |
| 7,092,561 B2 | 8/2006 | Downs, Jr. |
| 7,103,438 B2 | 9/2006 | Hallowell et al. |
| 7,171,032 B2 | 1/2007 | Jones et al. |
| 7,181,430 B1 | 2/2007 | Buchanan et al. |
| 7,191,151 B1 | 3/2007 | Nosek |
| 7,191,657 B2 | 3/2007 | Maier et al. |
| 7,197,173 B2 | 3/2007 | Jones et al. |
| 7,201,320 B2 | 4/2007 | Csulits et al. |
| 7,209,571 B2 | 4/2007 | Davis et al. |
| 7,216,106 B1 | 5/2007 | Buchanan et al. |
| 7,232,024 B2 | 6/2007 | Mazur et al. |
| 7,362,891 B2 | 4/2008 | Jones et al. |
| 7,366,338 B2 | 4/2008 | Jones et al. |
| 7,376,603 B1 | 5/2008 | Mayr et al. |
| 7,386,511 B2 | 6/2008 | Buchanan et al. |
| 7,391,897 B2 | 6/2008 | Jones et al. |
| 7,436,979 B2 | 10/2008 | Bruce et al. |
| 7,440,924 B2 | 10/2008 | Buchanan et al. |
| 7,503,445 B2 | 3/2009 | Yoshioka |
| 7,505,831 B2 | 3/2009 | Jones et al. |
| 7,505,931 B2 | 3/2009 | Da Silva |
| 7,516,360 B2 | 4/2009 | Bacher et al. |
| 7,542,598 B2 | 6/2009 | Jones et al. |
| 7,590,274 B2 | 9/2009 | Raterman et al. |
| 7,591,428 B2 | 9/2009 | Freeman et al. |
| 7,599,543 B2 | 10/2009 | Jones et al. |
| 7,602,956 B2 | 10/2009 | Jones et al. |
| 7,619,721 B2 | 11/2009 | Jones et al. |
| 7,620,231 B2 | 11/2009 | Jones et al. |
| 7,624,071 B2 | 11/2009 | Buchanan et al. |
| 7,628,326 B2 | 12/2009 | Freeman et al. |
| 7,635,082 B2 | 12/2009 | Jones |
| 7,686,151 B2 | 3/2010 | Renz et al. |
| 7,702,588 B2 | 4/2010 | Gilder et al. |
| 7,729,990 B2 | 6/2010 | Marceau et al. |
| 7,735,621 B2 | 6/2010 | Hallowell et al. |
| 7,762,380 B2 | 7/2010 | Freeman et al. |
| 7,778,456 B2 | 8/2010 | Jones et al. |
| 7,779,982 B2 | 8/2010 | Fitzgerald et al. |
| 7,789,243 B2 | 9/2010 | Hornung et al. |
| 7,792,753 B1 | 9/2010 | Slater et al. |
| 7,797,239 B2 | 9/2010 | Smith |
| 7,802,721 B2 | 9/2010 | Wilson, Jr. et al. |
| 7,817,842 B2 | 10/2010 | Mennie |
| 7,822,629 B2 | 10/2010 | Chen et al. |

(56) References Cited

U.S. PATENT DOCUMENTS

| | | |
|---|---|---|
| 7,849,994 B2 | 12/2010 | Klein et al. |
| 7,873,200 B1 | 1/2011 | Oakes, III et al. |
| 7,873,576 B2 | 1/2011 | Jones et al. |
| 7,881,519 B2 | 2/2011 | Jones et al. |
| 7,882,000 B2 | 2/2011 | Jones |
| 7,885,451 B1 | 2/2011 | Walls et al. |
| 7,885,880 B1 | 2/2011 | Prasad et al. |
| 7,903,863 B2 | 3/2011 | Jones et al. |
| 7,929,749 B1 | 4/2011 | Jones et al. |
| 7,938,245 B2 | 5/2011 | Jenrick et al. |
| 7,946,406 B2 | 5/2011 | Blake et al. |
| 7,950,656 B2 | 5/2011 | Adams |
| 7,962,411 B1 | 6/2011 | Prasad et al. |
| 7,970,677 B1 | 6/2011 | Oakes, III et al. |
| 7,978,899 B2 | 7/2011 | Jenrick et al. |
| 8,025,213 B2 | 9/2011 | Hartfield et al. |
| 8,027,928 B1 | 9/2011 | Hecht, Jr. et al. |
| 8,041,098 B2 | 10/2011 | Jones et al. |
| 8,045,784 B2 | 10/2011 | Price et al. |
| 8,060,442 B1 | 11/2011 | Hecht et al. |
| 8,073,751 B2 | 12/2011 | Garg et al. |
| 8,082,207 B2 | 12/2011 | Bates et al. |
| 8,103,084 B2 | 1/2012 | Jones et al. |
| 8,125,624 B2 | 2/2012 | Jones et al. |
| 8,126,793 B2 | 2/2012 | Jones |
| 8,162,125 B1 | 4/2012 | Csulits et al. |
| 8,169,602 B2 | 5/2012 | Jones et al. |
| 8,204,293 B2 | 6/2012 | Csulits et al. |
| 8,214,373 B1 | 7/2012 | Bakir et al. |
| 8,214,686 B2 | 7/2012 | Ueda |
| 8,265,346 B2 | 9/2012 | Blair |
| 8,290,216 B1 | 10/2012 | Blair |
| 8,297,428 B2 | 10/2012 | Renz et al. |
| 8,301,565 B2 | 10/2012 | Cantley et al. |
| 8,322,505 B2 | 12/2012 | Freeman et al. |
| 8,331,643 B2 | 12/2012 | Yacoubian et al. |
| 8,339,589 B2 | 12/2012 | Jones et al. |
| 8,412,605 B2 | 4/2013 | Griffin et al. |
| 8,474,704 B1 | 7/2013 | Grimm et al. |
| 8,504,456 B2 | 8/2013 | Griffin et al. |
| 8,526,751 B2 | 9/2013 | Mitchell et al. |
| 8,527,412 B1 | 9/2013 | Waldron, III et al. |
| 8,600,879 B2 | 12/2013 | Reyes |
| 8,610,966 B2 | 12/2013 | Hatzav et al. |
| 8,639,062 B2 | 1/2014 | Calman et al. |
| 8,714,336 B2 | 5/2014 | Csulits et al. |
| 8,718,367 B1 | 5/2014 | Schneider et al. |
| 8,738,529 B2 | 5/2014 | Kolhatkar et al. |
| 8,799,161 B2 | 8/2014 | Kreutz et al. |
| 8,824,785 B2 | 9/2014 | Ives et al. |
| 8,864,029 B2 | 10/2014 | McGlamery et al. |
| 9,025,851 B2 | 5/2015 | Smith et al. |
| 9,082,007 B2 | 7/2015 | Smith et al. |
| 2001/0034682 A1 | 10/2001 | Knight et al. |
| 2001/0037297 A1 | 11/2001 | McNair |
| 2001/0051921 A1 | 12/2001 | Garner, IV et al. |
| 2002/0038289 A1 | 3/2002 | Lawlor et al. |
| 2002/0072942 A1 | 6/2002 | Kuykendall et al. |
| 2002/0082994 A1 | 6/2002 | Herziger |
| 2002/0087409 A1 | 7/2002 | Joao |
| 2002/0128969 A1 | 9/2002 | Parmelee et al. |
| 2003/0059098 A1 | 3/2003 | Jones et al. |
| 2003/0066876 A1 | 4/2003 | Goldman et al. |
| 2003/0120586 A1 | 6/2003 | Litty |
| 2003/0126444 A1 | 7/2003 | Wakao et al. |
| 2003/0128375 A1 | 7/2003 | Ruhl et al. |
| 2003/0138128 A1 | 7/2003 | Rhoads |
| 2003/0217005 A1 | 11/2003 | Drummond et al. |
| 2004/0133516 A1 | 7/2004 | Buchanan et al. |
| 2004/0153650 A1 | 8/2004 | Hillmer |
| 2004/0153663 A1 | 8/2004 | Clark et al. |
| 2004/0218729 A1 | 11/2004 | Xue et al. |
| 2004/0245330 A1 | 12/2004 | Swift et al. |
| 2005/0034054 A1 | 2/2005 | Tsuyama et al. |
| 2005/0038756 A1 | 2/2005 | Nagel |
| 2005/0049950 A1 | 3/2005 | Johnson |
| 2005/0071283 A1* | 3/2005 | Randle ................ G06Q 20/04 705/75 |
| 2005/0080701 A1 | 4/2005 | Tunney et al. |
| 2005/0097019 A1 | 5/2005 | Jacobs |
| 2005/0125296 A1 | 6/2005 | Tidwell et al. |
| 2005/0139670 A1 | 6/2005 | McGlamery et al. |
| 2005/0160227 A1* | 7/2005 | Todd ................ G06F 12/0261 711/133 |
| 2005/0213805 A1 | 9/2005 | Blake et al. |
| 2005/0220324 A1* | 10/2005 | Klein ................ G06K 9/036 382/112 |
| 2005/0244035 A1 | 11/2005 | Klein et al. |
| 2005/0283609 A1 | 12/2005 | Langford |
| 2006/0028689 A1 | 2/2006 | Perry et al. |
| 2006/0059201 A1 | 3/2006 | Watanabe |
| 2006/0080245 A1 | 4/2006 | Bahl et al. |
| 2006/0089905 A1 | 4/2006 | Song et al. |
| 2006/0106717 A1 | 5/2006 | Randle et al. |
| 2006/0116898 A1 | 6/2006 | Peterson |
| 2006/0117182 A1 | 6/2006 | Wolff |
| 2006/0156382 A1* | 7/2006 | Motoyama ........ G06F 21/6209 726/1 |
| 2006/0182331 A1 | 8/2006 | Gilson et al. |
| 2006/0212391 A1 | 9/2006 | Norman et al. |
| 2006/0212502 A1 | 9/2006 | Chatterjee |
| 2006/0247992 A1 | 11/2006 | Song et al. |
| 2006/0248009 A1 | 11/2006 | Hicks et al. |
| 2006/0282660 A1 | 12/2006 | Varghese et al. |
| 2007/0043650 A1 | 2/2007 | Hughes et al. |
| 2007/0045395 A1 | 3/2007 | Corona et al. |
| 2007/0100750 A1 | 5/2007 | Hartfield et al. |
| 2007/0124241 A1 | 5/2007 | Newton |
| 2007/0150412 A1 | 6/2007 | Lamparello et al. |
| 2007/0174214 A1 | 7/2007 | Welsh et al. |
| 2007/0288382 A1* | 12/2007 | Narayanan ........ G06Q 20/04 705/45 |
| 2008/0016358 A1 | 1/2008 | Filreis et al. |
| 2008/0040249 A1 | 2/2008 | Re et al. |
| 2008/0059962 A1 | 3/2008 | Ito |
| 2008/0077474 A1 | 3/2008 | Dumas et al. |
| 2008/0086420 A1 | 4/2008 | Gilder et al. |
| 2008/0086421 A1 | 4/2008 | Gilder et al. |
| 2008/0103800 A1 | 5/2008 | Domenikos et al. |
| 2008/0103972 A1 | 5/2008 | Lanc |
| 2008/0116257 A1 | 5/2008 | Fickling |
| 2008/0140576 A1 | 6/2008 | Lewis et al. |
| 2008/0249931 A1 | 10/2008 | Gilder et al. |
| 2008/0256167 A1 | 10/2008 | Branson et al. |
| 2008/0270206 A1 | 10/2008 | Gillum |
| 2008/0294514 A1 | 11/2008 | Calman |
| 2008/0294541 A1 | 11/2008 | Weinflash et al. |
| 2008/0307258 A1 | 12/2008 | Challenger et al. |
| 2008/0319922 A1 | 12/2008 | Lawrence et al. |
| 2009/0008442 A1 | 1/2009 | Buchanan et al. |
| 2009/0018958 A1 | 1/2009 | Aveyard et al. |
| 2009/0094148 A1 | 4/2009 | Gilder et al. |
| 2009/0106846 A1 | 4/2009 | Dupray et al. |
| 2009/0141962 A1 | 6/2009 | Borgia et al. |
| 2009/0150288 A1 | 6/2009 | Bishop et al. |
| 2009/0196485 A1* | 8/2009 | Mueller ................ G06K 9/036 382/137 |
| 2009/0248560 A1 | 10/2009 | Recce et al. |
| 2009/0248573 A1 | 10/2009 | Haggerty et al. |
| 2009/0309694 A1 | 12/2009 | Nichols et al. |
| 2010/0030644 A1 | 2/2010 | Dhamodharan |
| 2010/0070415 A1 | 3/2010 | Buchanan et al. |
| 2010/0122216 A1 | 5/2010 | Song et al. |
| 2010/0161466 A1 | 6/2010 | Gilder |
| 2010/0217612 A1* | 8/2010 | Apacible ................ G06F 16/22 705/1.1 |
| 2010/0299553 A1 | 11/2010 | Cen |
| 2010/0306111 A1 | 12/2010 | Slater et al. |
| 2011/0066547 A1 | 3/2011 | Clark et al. |
| 2011/0099067 A1 | 4/2011 | Cooper et al. |
| 2011/0161346 A1 | 6/2011 | Solihin |
| 2011/0215034 A1 | 9/2011 | Mennie et al. |
| 2011/0276483 A1 | 11/2011 | Saegert et al. |

(56) References Cited

U.S. PATENT DOCUMENTS

| | | | |
|---|---|---|---|
| 2012/0030678 A1* | 2/2012 | Hayduchok | G06Q 10/0833 718/101 |
| 2012/0117423 A1 | 5/2012 | Andrade et al. | |
| 2012/0189186 A1 | 7/2012 | Csulits et al. | |
| 2013/0024360 A1 | 1/2013 | Ballout | |
| 2013/0097464 A1 | 4/2013 | Ahmad et al. | |
| 2013/0325698 A1 | 12/2013 | Shao et al. | |
| 2014/0058914 A1 | 2/2014 | Song et al. | |
| 2014/0188804 A1* | 7/2014 | Gokhale | G06F 21/6218 707/645 |
| 2014/0233831 A1* | 8/2014 | Palmer | G06F 17/30244 382/137 |
| 2014/0233836 A1* | 8/2014 | Smith | G06Q 20/0425 382/137 |
| 2014/0236791 A1* | 8/2014 | Palmer | G06Q 40/02 705/35 |
| 2014/0250336 A1 | 9/2014 | Tepus | |
| 2014/0281704 A1 | 9/2014 | Jacobson et al. | |
| 2014/0330789 A1* | 11/2014 | Copes | G06Q 10/10 707/665 |
| 2014/0358863 A1* | 12/2014 | Bennett | G06F 17/30073 707/665 |
| 2015/0195190 A1 | 7/2015 | Heydari et al. | |
| 2016/0034362 A1 | 2/2016 | Al-Wahabi | |
| 2017/0109837 A1 | 4/2017 | Loganathan et al. | |
| 2017/0168959 A1 | 6/2017 | Dodonov et al. | |

FOREIGN PATENT DOCUMENTS

| | | |
|---|---|---|
| CN | 101059863 A | 10/2007 |
| EP | 115189 A1 | 10/1987 |
| EP | 671696 A1 | 9/1995 |
| EP | 1507243 A2 | 2/2005 |
| JP | 2006155439 A | 6/2006 |
| WO | 03040881 A2 | 5/2003 |
| WO | 2004036386 A2 | 4/2004 |
| WO | 2005006269 A1 | 1/2005 |

OTHER PUBLICATIONS

Chen, Ming-ju et al. "A Digital Watermarking of Detecting the Image Integrity Based on DWT." Information and Electronic Engineering. vol. 6, No. 2, Apr. 2008. Chinese Language. 4 pages.

Han, Shui-Hua et al. "Content-based image authentication: current status, issues, and challenges." Int. J. Inf. Secur. (2010) 9:19-32. DOI 10.1007/s10207-009-0093-2. Regular Contribution. Published Online Oct. 8, 2009. 0 Springer-Verlag 2009.

International Preliminary Report of Patentability and Written Opinion dated Jun. 5, 2012 for International Application No. PCT/US2010/058380.

International Preliminary Report of Patentability and Written Opinion dated Jun. 5, 2012 for International Application No. PCT/US2010/058403.

International Preliminary Report of Patentability and Written Opinion dated Jun. 5, 2012 for International Application No. PCT/US2010/058409.

International Preliminary Report of Patentability and Written Opinion dated Jun. 5, 2012 for International Application No. PCT/US2010/058414.

International Preliminary Report on Patentability dated Apr. 22, 2010 for International Application No. PCT/US2008/085873.

International Preliminary Report on Patentability dated Jul. 3, 2006 for International Application No. PCT/US2004/043832.

International Search Report and Written Opinion dated Jan. 24, 2011 for International Application No. PCT/US2010/058403.

International Search Report and Written Opinion dated Jan. 24, 2011 for International Application No. PCT/US2010/058414.

International Search Report and Written Opinion dated Jan. 31, 2011 for International Application No. PCT/US2010/058409.

International Search Report and Written Opinion dated Jan. 24, 2011 for International Application No. PCT/US2010/058380.

International Search Report dated Apr. 23, 2008 for International Application No. PCT/US2007/083198.

International Search Report and Written Opinion dated May 19, 2005 for International Application No. PCT/US2004/043832.

Kwak et al., "Benefits, obstacles, and future of six sigma approach", Technovation, vol. 26, pp. 708-715, 2006.

Labys, W. P. (2001). Essays on microstructure and the use of information in limit order markets. (Order No. 3003649, University of Pennsylvania). ProQuest Dissertations and Theses, 195-195 p. Retrieved from http://search.proquest.com/docview/251101049?accountid=14753. (251101049).

Mitchell, Joseph Pershing, I., 11. (2000) The central bankers: Administrative legitimacy and the federal reserve system. (Order No. 3065450, Virginia Polytechnic Institute and State University). ProQuest Dissertations and Theses, 269-269 p. Retrieved from http://search.proquest.com/docview/304626254?accountid=14753. (304626254).

Muller, J. D. (1998). Selected development in the law of cyberspace payments. The Business Lawyer, 54(1), 403-441. Retrieved from http://search.proquest.com/docview/228450582?accountid=14753.

Patricia Murphy, It's a Time of CHANGE for Check Processing, May 2004, USBanker, pp. 1-5.

State Intellectual Property Office of the People's Republic of China. Chinese Office Action dated May 11, 2012. Chinese Application No. 200810177822.1. Name of Applicant: Bank of America Corporation. Chinese Language. 34 pages.

"Money Laundering: A Banker's Guide to Avoiding Problems," published on the internet at www.occ.treas.gov/money-laundering/pub-money-laundering-bankers-guide, Dec. 2002. (Year:2002).

* cited by examiner

ARCHIVE VALIDATION SYSTEM WITH DATA PURGE TRIGGERING

BACKGROUND

With advances in technology, entities and individuals alike are starting to store more and more documents, pictures, illustrations, or other images, electronically. In this way, the space required for paper storage is drastically reduced and image data is being stored on computers or databases. Entities typically receive large volumes of documents from vendors, customers, or employees on any given day. Each document may be saved electronically, thus cutting down on space required for paper storage of the documents. In some instances, entities are required to store the data for a period of time after receiving it. Furthermore, entities may also have to recall the data. Therefore, a need exists for a way to limit the storage space required for documents and effectively recall the data, when necessary.

BRIEF SUMMARY

Embodiments of the present invention address the above needs and/or achieve other advantages by providing apparatuses (e.g., a system, computer program product and/or other devices) and methods for creating a feedback loop that can be used for enhancements for archive validation and retention parameter determination. In this way, the system may conduct queries of purged document including image quality and data storage metrics to provide feedback to determine enhancements for retention parameters of future documents. In this way, an entity may store limited amounts of data from an original document and subsequently recreate the document image. In this way, the entire document may not need to be stored as an image file, instead critical aspects of the document may be stored. Subsequently, the document image may be recreated using templates or lift technology for reconciliation or the like.

The invention uses image quality and data storage metrics to determine retention parameters for documents and when the documents may be destroyed. In some embodiments, the system may determine what documents should be reviewed, rescanned, or the like based on image quality and data storage metrics. Furthermore, under specific programs, the system may be required to store and recreate documents, such as financial documents, with certain criteria within a specific timeframe from image data stored from the original document. The system uses image quality and data storage metrics to determine what document attributes must be stored as either metadata and/or image data. For example, document attributes may include a magnetic ink character recognition (MICR), amount, content, or the like associated with the document. Furthermore, a determination may be made as to whether the document is stored as an image document at all, these determinations may be based on legal requirements, document importance, user factors, image quality, and/or data storage metrics. The system may store metadata and image data associated with the document that is needed for business. Subsequently, the system determines if the paper documents is required to be stored also. Both qualitative and quantitative data is used to determine this. Image quality factors are determined, such as did the image require review and keying, the image scan confidence, did the document undergo exception processing, are images in proper form for archiving, and the like. The system allows an associate at the entity to set criteria as needed to determine what is destroyed and/or saved. Furthermore, outside or alternative factors may dictate the maintaining of the payer document, such as a geographical disaster, a problem at a particular branch where the document is received, or the like. They system may determine a duration of storage for the documents.

In some embodiments, the image data associated with the document must reach a quality level so that the document may be retrieved and generated in an image form. The system may also store metadata about the history or a document, such as how many times it was accessed to determine if it can or needs to be destroyed at a later time.

In some embodiments, the invention may receive documents that are to be stored as an image and/or stored as paper documents. Typically, images of these documents are captured and stored for recall and regulation purposes. Traditionally, metadata and image data for the entire document may be stored. This may include generic image data, such as the background image of the document, and the like. However, this requires a large amount of data storage to store each of a plurality of documents as an image file with high resolution. Furthermore, may times the paper or hard copy version of the document may also be stored. The documents may include a myriad of financial documents, including but not limited to checks, lease documents, mortgage documents, deposit slips, payment coupons, receipts, general ledger tickets, or the like.

In the present invention, once the document is received, the invention may capture and process an image of the document. The image document may be used to collect the information associated with the document. This information may include account data, dates, payee, payor, addresses, routing numbers, amounts, document backgrounds, or other information that may be imperative to processing that document. The system may then store the data collected from the document.

In some embodiments, the data collected from the document may be processed and stored as metadata associated with the document. In this way, the image of the document may be captured and the data reprocessed into text or non-image data for storage. As such, numbers, letters, or the like on the document may be captured as part of the document image, but be stored as text data. In some embodiments, the data collected from the document or portions thereof may be processed and stored as image data. In this way, portions of the image document may be cut out and maintained in storage as an image document. For example, specific elements of a document, such as the portion of a check that has a user signature on it may be captured and stored as an image file instead of being converted to text. In this way, the user's actual signature may still be stored as an image. In yet other embodiments, some portions of the document may be processed and stored as metadata while other portions of the document may be processed and stored as image data.

In some embodiments, the image of the document may then be processed through image quality metrics and data storage metrics. Furthermore, the image of the documents is screened using user defined criteria and alternative defined criteria. Using the metrics and criteria provide a determination as to if the paper document may require retention, the duration of retention, the location of retention, and the like.

In some embodiments, the paper document may be retained for a duration of time along with the image data associated with the document. In other embodiments, the paper document may be destroyed and only the image of the document may be retained.

In some embodiments, if a paper document is retained, the system may continually monitor the access to the document, characteristics of the document, and the like to determine if future retention is required for the paper document.

In some embodiments, the document, whether paper or image, may be required or requested to be presented at a future time period for legal, reconciliation, or other purposes. In some embodiments, if the paper document is retained, the system may search and pull the paper document for the desired request. In some embodiments, if the metrics and criteria determine that a paper document may not be retained, the system may be required to generate a subsequent document that may be used for the purposes of the request by using the image data.

Using this data, the system may be able to recreate the document. In some embodiments, recreation of the document image may occur by using templates. In other embodiments, recreation of the document image may occur by using payee lift. In some embodiments, recreation of the document image may occur via templates. In this way, the system may have previously created and stored generic control documents or templates. These templates may be blank documents that match or correspond closely to a standard document. For example, the system may store a generic control document for a check. This generic control check may look like a standard check image. It may comprise an address line, pay to the order of line, amount line, amount box, memo line, and signature line. However, this generic control document does not have custom user check backgrounds such as animals or the like. In some embodiments, recreation of the document image may occur by using image lift (or payee lift). In this way, the system may combine metadata and image lift data to generate an image document for the user upon request. Image lift, as used herein may refer to the process of lifting one or more areas/elements of a document and storing those areas as image files. These areas may be locations on a document that the user, merchant, financial institution, or the like has hand written or stamped. As such, upon receiving a document for image storage, the system may select specific areas of the document to store as image files, such as a signature block or the like. These lift data portions, along with the metadata may be stored for recreation of the document image.

Furthermore, the system may identify purged and/or destroyed documents. In this way, the system may identify one or more documents that were determined to be purged and destroyed from the system. The system may compile data points form the metrics and criteria for the purged document. As such, any metrics and criteria that were identified for the purged document may be compiled, such any confidence ratings, exceptions, keyed portions, image formats, storage requirements, document importance parameters, and/or regulation requirements.

In some embodiments, the system may compile monitoring metadata from the retention period of the purged documents. The data points and monitoring metadata are reviewed for feedback loop revisions in the retention parameters. As such, any changes in the initial retention that may have been determined during the retention period may be used to adjust the retention period for future documents. The review may aid in enhancing the retention parameter determination with data from the purged documents. The enhancing of the retention parameters include the feedback loop revisions generated from above.

Next, the system creates a direct feedback loop for communication and integration of enhancement into metrics and criteria for retention parameter determination. The direct feedback loop generates a communicable link for communicating the enhancements and integration of the enhancements into the metrics and criteria. Finally, the system revises the retention periods of the documents based on enhancements.

Embodiments of the invention relate to systems, methods, and computer program products for feedback loop enhancement of retention parameter determination, the system comprising: receiving an indication of a user transaction, wherein receiving an indication of the user transaction comprises receiving transaction documents associated with the user transaction; generating image documents of the transaction documents, wherein generating image documents comprises determining data from the transaction documents and storing the determined data as text data and determining elements from the transaction documents, wherein elements are captured images of the transaction documents and are stored as image data; processing the image documents through image quality metrics and data storage metrics; triggering a retention parameter for transaction documents associated with the user transaction based on the image quality metrics and the data storage metrics; monitoring the transaction documents during retention and generate metadata associated with actions, such as accesses, to the transaction documents during the retention; purging paper transaction document upon termination of the retention; identifying purged transaction documents and compile data points from the image quality metrics and data storage metrics for the purged transaction documents; extracting the metadata associated with the purged transaction documents during retention; determining revisions in retention parameters based on a review of the data points and metadata; and creating direct feedback loop for communicable linkage and integration of revisions in retention parameters into image quality metrics and data storage metrics.

In some embodiments, the invention further comprises generating enhancements to the retention parameter determination for feedback looping and integration of enhancements to the retention parameter determination.

In some embodiments, image quality metrics comprise identifying exception processing of the image documents, identifying required manual review of the image documents, identifying manually keyed portions of the image documents, and identifying a format of the image documents. In some embodiments, data storage metrics comprise entity wide storage space available and required for storage of the image documents and importance of the transaction documents to a user and to a financial institution.

In some embodiments, the invention further comprises identifying a duration of current retention parameters being inaccurate for the transaction document and adjusting the duration of the retention parameters for similar documents received at a future time by implementation of the revisions based on the identified inaccurate duration of retention parameters for the transaction document.

In some embodiments, the invention further comprises processing the image documents and the transaction documents based on entity defined and alternative defined criteria, wherein entity defined criteria identify one or more elements of the image documents or the transaction documents that triggers a rule for retention and wherein alternative defined criteria identify a geographic location of storage of the image documents or the transaction documents that triggers a rule for retention duration.

In some embodiments, transaction documents comprise one or more of a check, deposit ticket, automated teller machine (ATM) receipt, or general ledger ticket.

In some embodiments, the invention further comprises merging retrieved stored text data and stored image data from the transaction documents together to reproduce the transaction document based on a received request for the transaction documents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
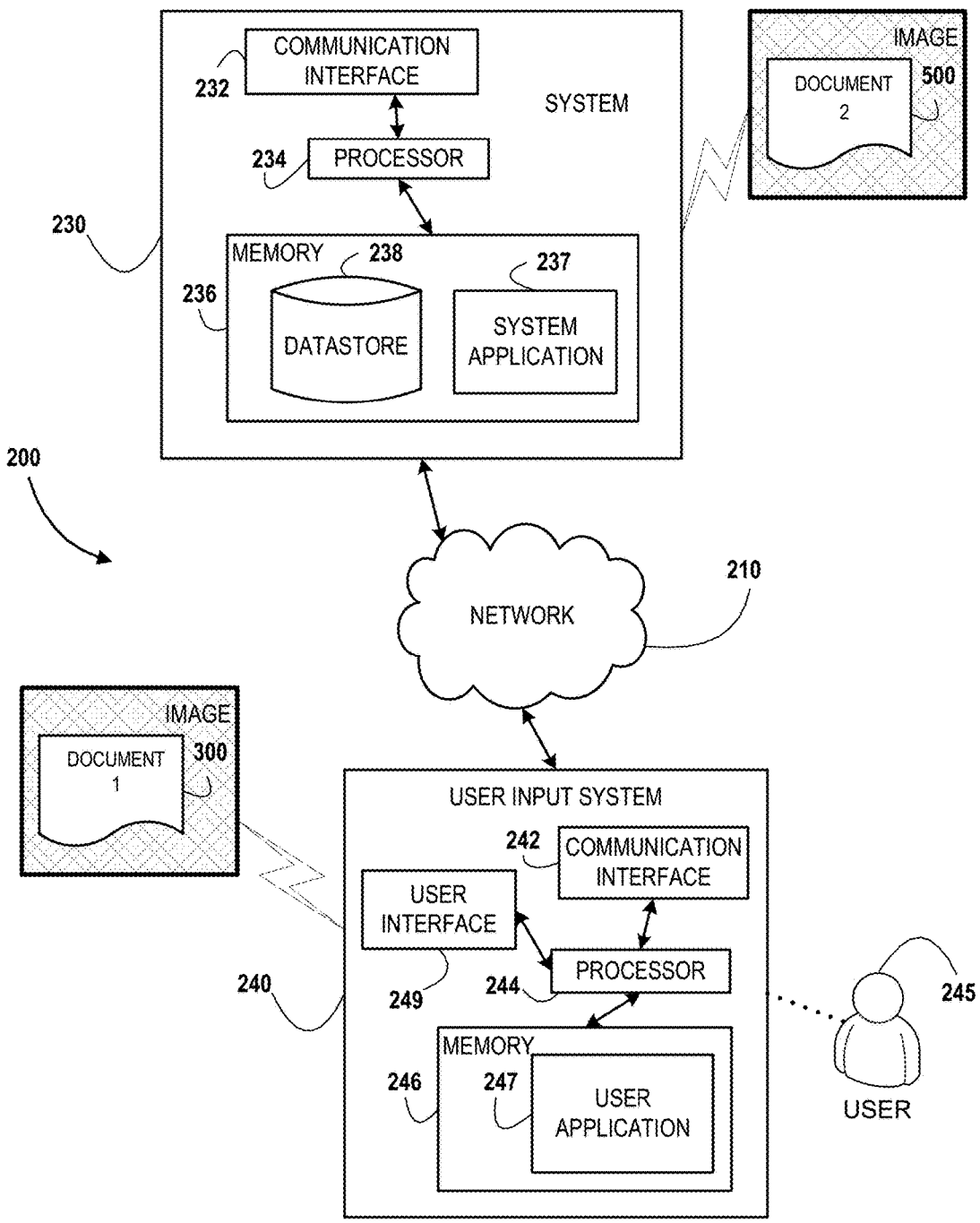
Figure 2:
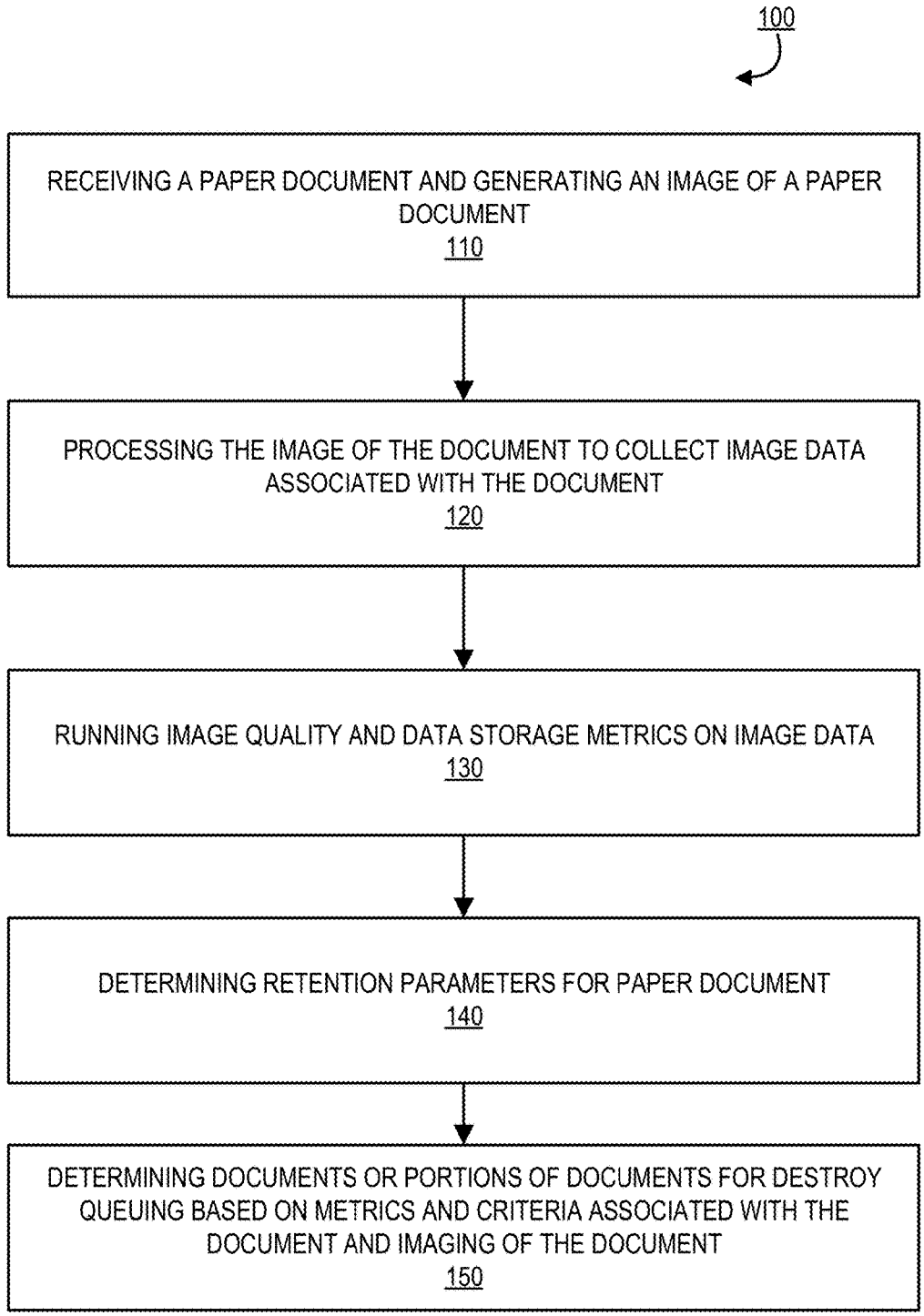
Figure 3:
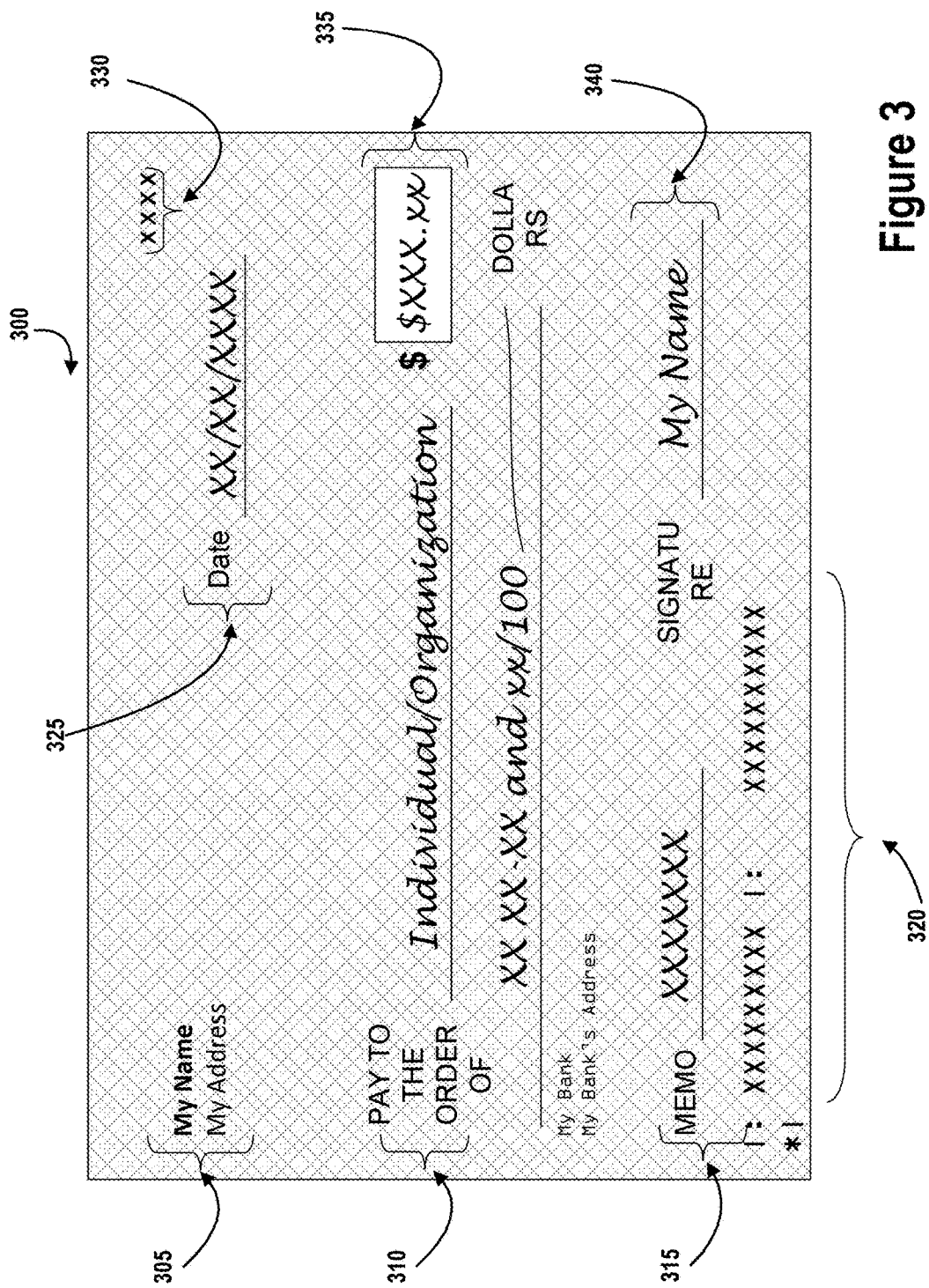
Figure 4:
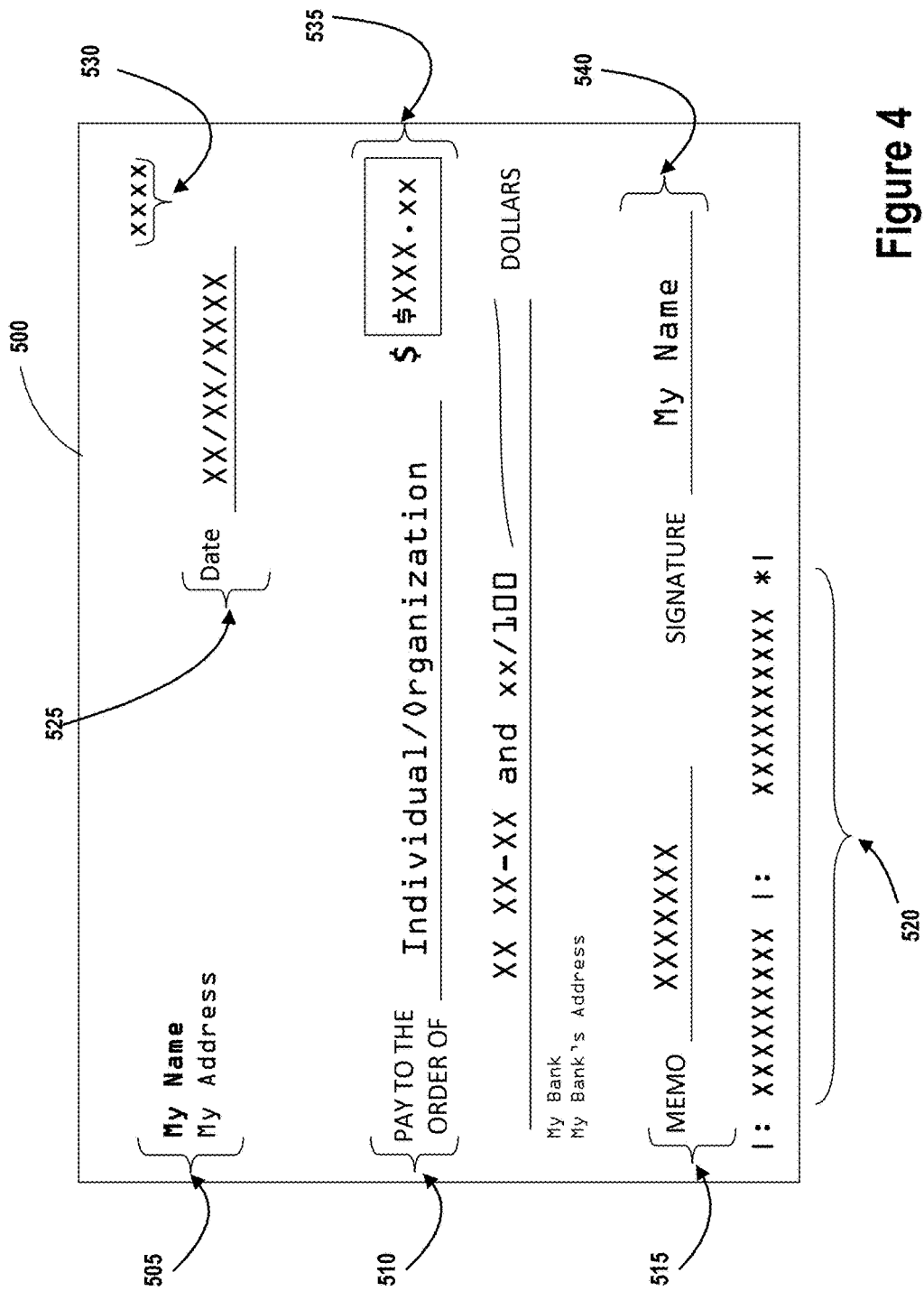
Figure 5:
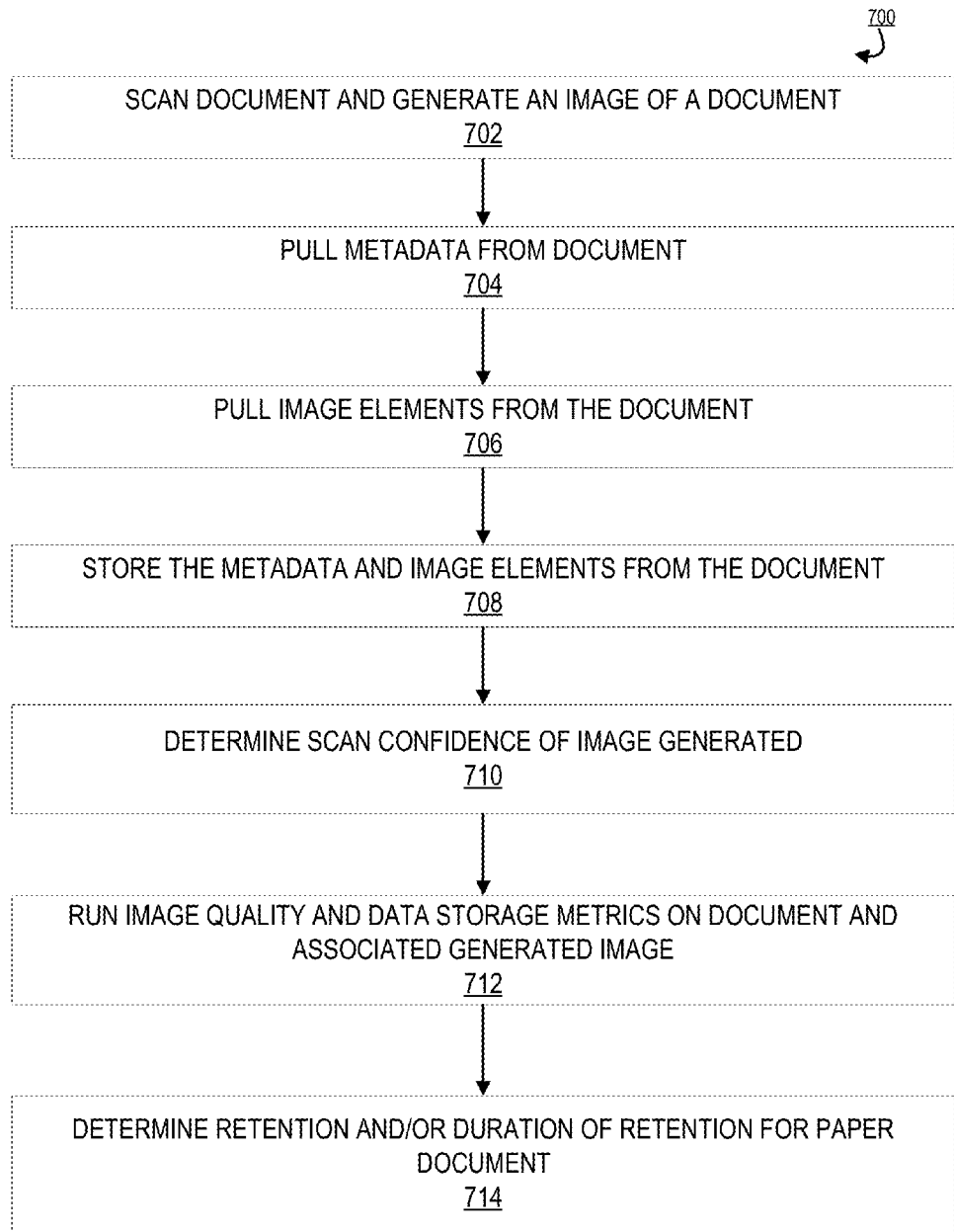
Figure 6:
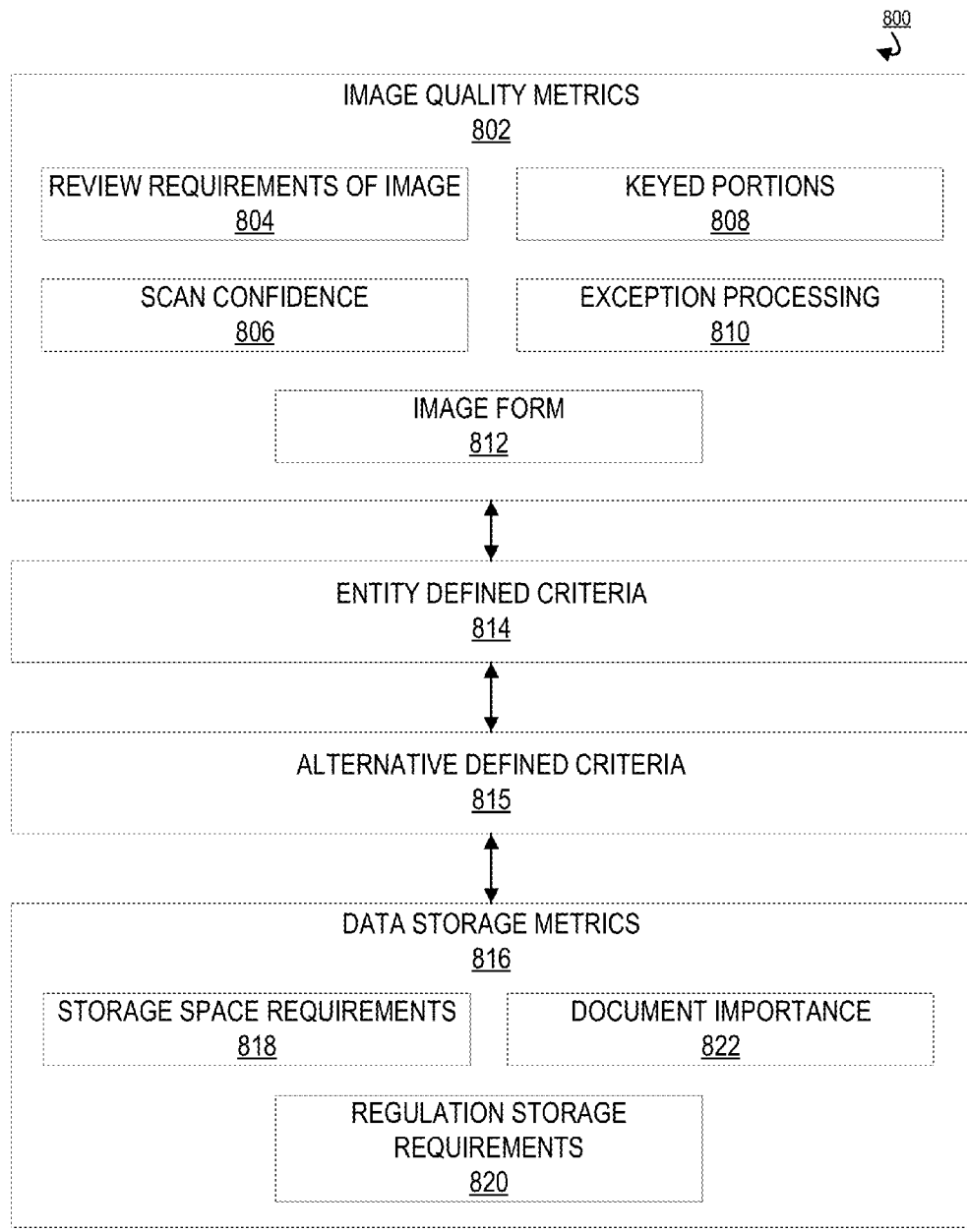
Figure 7:
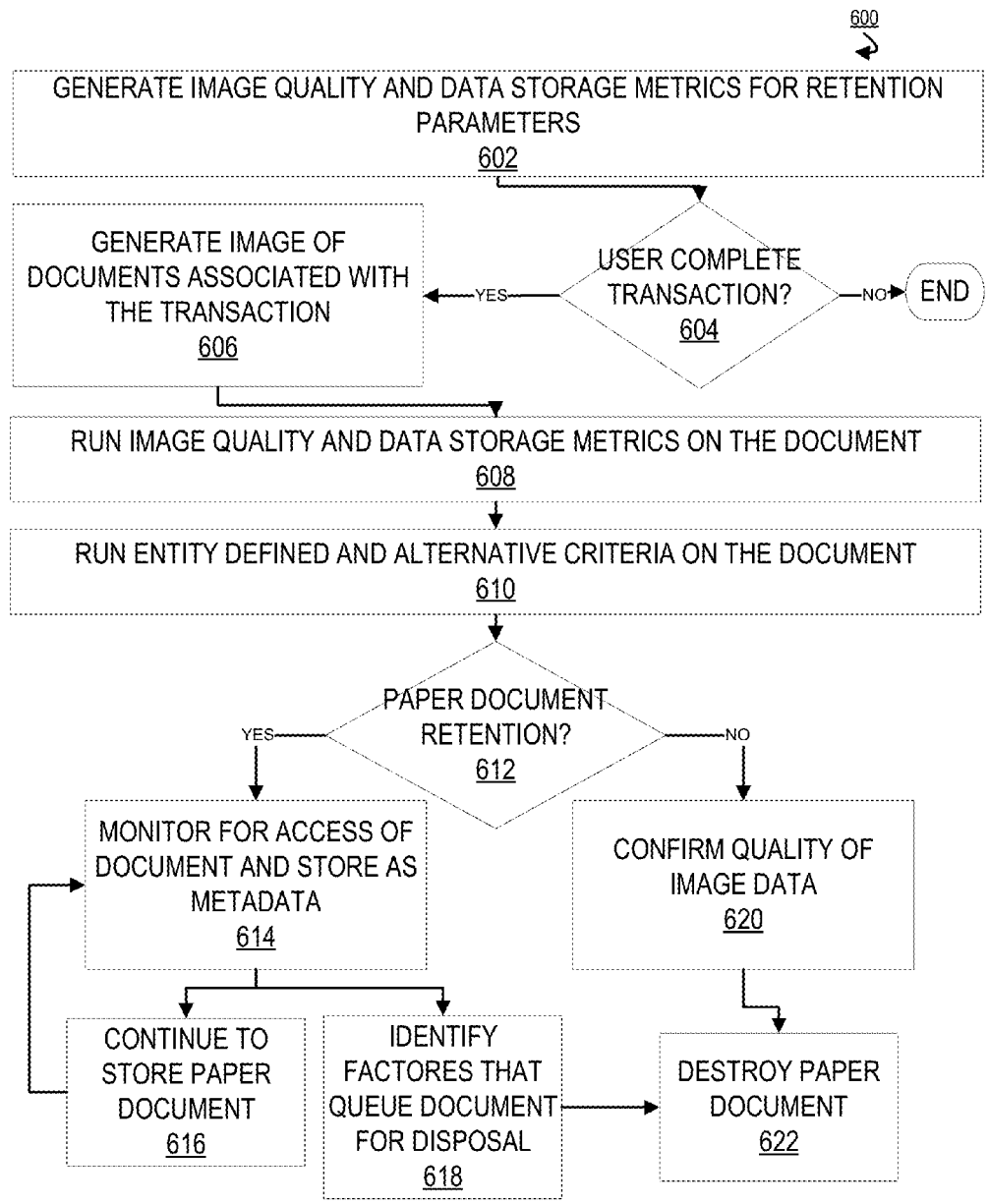
Figure 8:
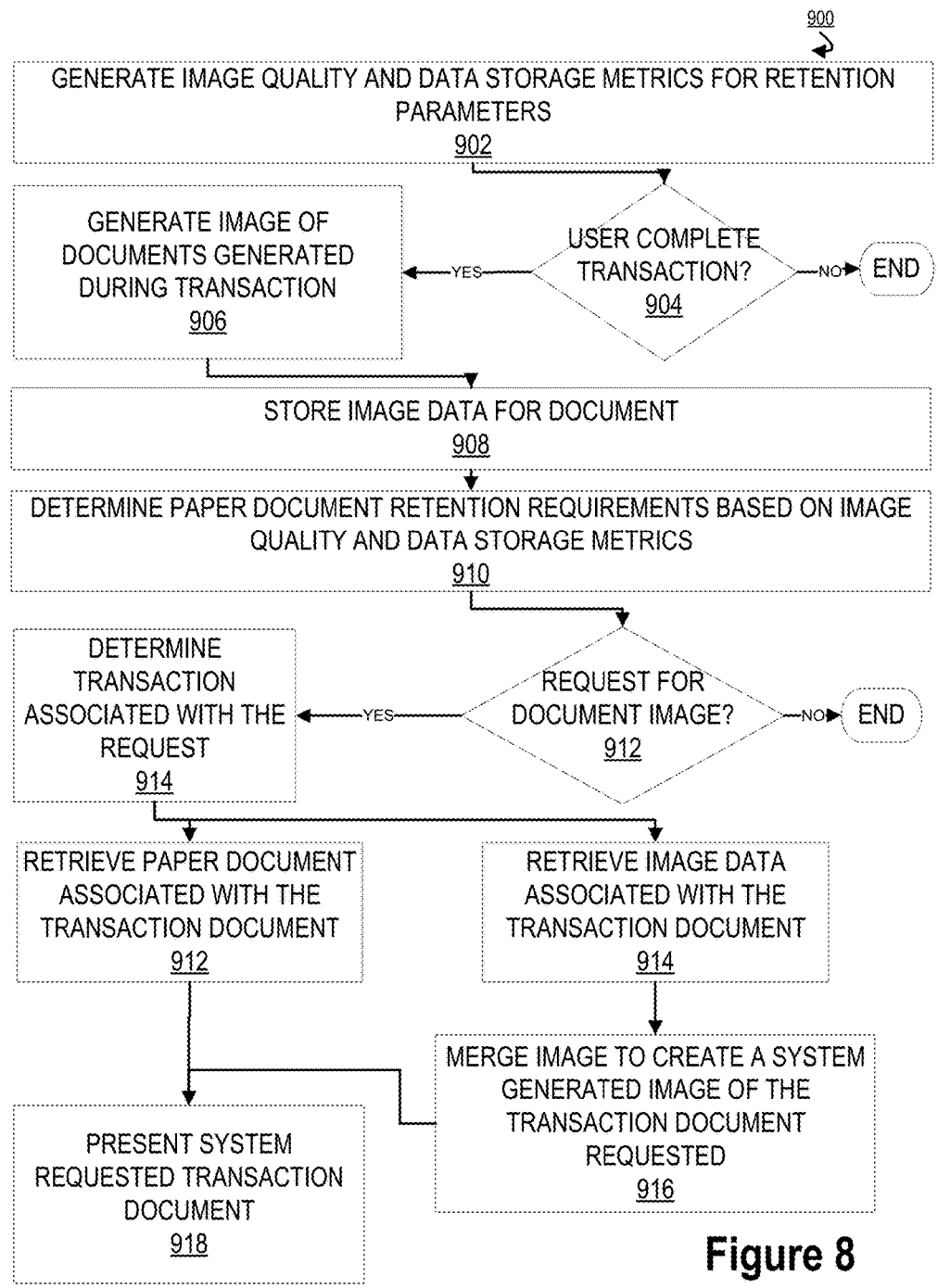
Figure 9:
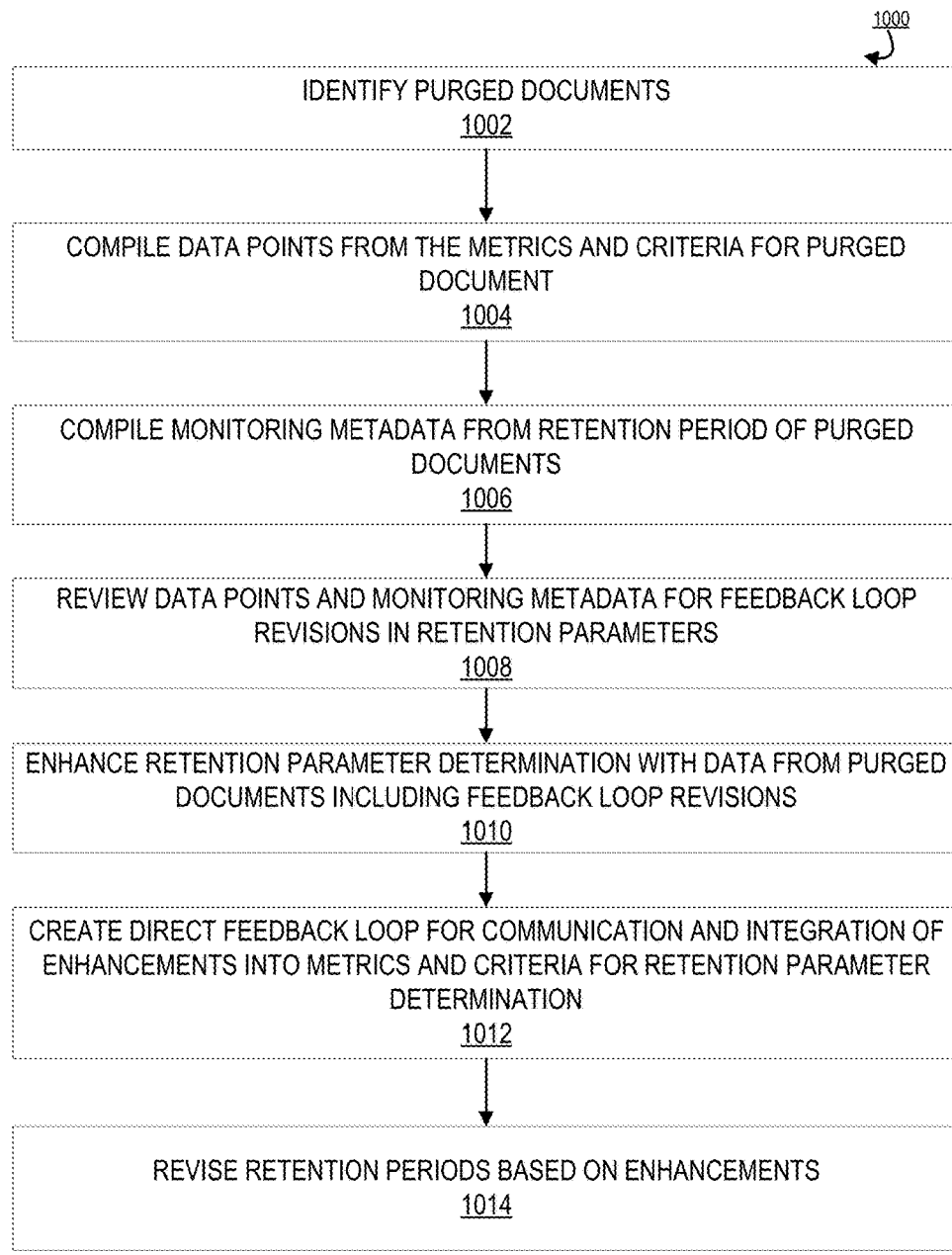

Having thus described embodiments of the invention in general terms, reference will now be made to the accompanying drawings, wherein:

FIG. 1 provides an archive validation with data purge system environment, in accordance with one embodiment of the present invention;

FIG. 2 provides a high level process flow illustrating archive validation with data purge triggering process, in accordance with one embodiment of the present invention;

FIG. 3 provides an illustration of an example of an image document, in accordance with one embodiment of the present invention;

FIG. 4 provides an illustration of an example of an image document, in accordance with one embodiment of the present invention;

FIG. 5 provides a process flow illustrating document receiving and image generation, in accordance with one embodiment of the present invention;

FIG. 6 provides a process flow illustrating metrics and criteria for paper document retention, in accordance with one embodiment of the present invention;

FIG. 7 provides a decision process flow illustrating paper document retention, in accordance with one embodiment of the present invention;

FIG. 8 provides a decision process flow illustrating paper document retention determination and document generation, in accordance with one embodiment of the present invention; and FIG. 9 provides a process flow illustrating a feedback loop for integration of enhancements into metrics and criteria, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. As used herein, a "check" or a "document" may also refer to a myriad of financial documents, including but not limited to a lease document, a mortgage document, a deposit slip, a payment coupon, a receipt, general ledger tickets, or the like. In some embodiments, the check or document may exist as a physical item printed on paper or other medium. In other embodiments, the check may exist electronically. Furthermore, the term "image lift data" or "payee lift data" may refer to the process of lifting one or more areas/elements of a document and storing those areas as image files without storing the entire document as an image file.

A "transaction" or "resource distribution" refers to any communication between a user and the financial institution or other entity monitoring the user's activities. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The present invention comprises document imaging technology (such as check images), such as the receiving, processing, storing, and retrieving of document images, with a purpose of saving storage space in the archive of an entity (e.g., a financial institution). Currently, an entity's check imaging system may receive an image of a check at a high resolution (200 dots per inch (DPI)) and may store the image in the archive at this resolution for a mandated period of seven years. Furthermore, retention of paper documents for all or many documents may occur. However, regulations may not require that the archived documents be in paper form for a duration or that image be of this high resolution. To save storage space in the archive, the present invention may determine via metrics and criteria whether to retain paper document, a duration of retention, and image document storage requirements. A check is an example of a document that may be captured or processed in this invention. In some embodiments, the check may exist as a physical item printed on paper or other medium. In other embodiments, the check may exist electronically.

Embodiments of the invention are directed to a system, method, or computer program product for a distributive network system with specialized data feeds associated with the distributive network and specific triggering events associated with the data feeds for archive validation and data purge triggering. Thus, the system may purge stored paper documents based on triggering events. In this way, saving storage space both physically and on entity system servers.

FIG. 1 illustrates an archive validation with data purge system environment 200, in accordance with one embodiment of the present invention. As illustrated, the system environment 200 includes a network 210, a system 230, and a user input system 240. Also shown in FIG. 1 is a user 245 of the user input system 240. The user input system 240 may be a mobile device described herein. The user 245 may be a person who uses the user input system 240 to execute a user application 247. The user application 247 may be an application to communicate with the system 230, perform a transaction, input information onto a user interface presented on the user input system 240, provide paper documents, request retrieval of image documents, or the like. The user application 247 and/or the system application 237 may incorporate one or more parts of any process flow described herein.

As shown in FIG. 1, the system 230, and the user input system 240 are each operatively and selectively connected to the network 210, which may include one or more separate networks. In addition, the network 210 may include a telecommunication network, local area network (LAN), a wide area network (WAN), and/or a global area network (GAN), such as the Internet. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a tablet computing device, a network device, an ATM, a bank teller's equipment, and/or the like. As illustrated in FIG. 1, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information. Additionally, the user input system 240 may include a positioning system. The positioning system (e.g., a global positing system GPS) may enable at least one of the user input system 240 or an external server or computing device in communication with the user input system 240 to determine the location (e.g., location coordinates) of the user input system 240.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 1, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols. In some embodiments, the user application 247 may be associated with a mobile device, wherein the mobile device executes a check deposit application. In some embodiments, the user application 247 may be associated with an ATM at one of the entity's facilities. Thus, the ATM may include a check imaging system wherein the check imaging system captures an image of the check. Following successful capture of the image of the check, the ATM may transmit the image to the system 230 for processing, storage, generation of an image of the check, or the like. In other embodiments, the user application 247 may interact with a bank teller, his equipment, a kiosk in the entity's facility, or the like associated with the entity.

Also shown in FIG. 1 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 1 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be a server managed by the entity. The system 230 may be located at the facility associated with the entity or remotely from the facility associated with the entity. In some embodiments, such as the one illustrated in FIG. 1, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols. In some embodiments, the system application 237 may include the processing of the image of Document 1 300 from which the system 230 may collect check information, such as metadata and/or image lift data.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein. For example, the datastore 238 may store information associated with the user's account, check information, or the like. Further, the datastore 238 may comprise an archive, temporary storage locations, or the like.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current. FIG. 1 expresses the datastore 238 and its contents in more detail.

FIG. 1 also shows two document images, such as check images that interact with the system environment 200. The image of Document 1 300 may be the image of the check that is received by the user input system 240. The user input system 240 may collect the check information from the image of Document 1 300. The image of Document 2 500 may be the image of the check that is generated by the system 230. The image of Document 2 500 may be generated based on the document information stored in the datastore 238. Both images of Document 1 300 and Document 2 500 may include an image of the entire document, a thumbnail version of the image of the document, image lift data, individual pieces/elements of document information, or the like.

It will be understood that the embodiment of the system environment illustrated in FIG. 1 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flows described and/or contemplated herein in connection any process flow described herein. Additionally, the system 230 or the user input system 240 is configured to initiate presentation of any of the user interfaces described herein. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Furthermore, the system 230 may use the system application 237 to generate the system 230 generated images using, in some embodiments image lift data and metadata. As such, in some embodiments, the processor 234 may combine the metadata with image data and merge/blend the data together to form a document. As such, the system generated image may be created that reproduces a document image. Furthermore, the system application 237 may generate and run image quality and data storage metrics for retention determination on document images and paper documents. In some embodiments, the image quality and data storage metrics may be generated prior to document receiving. In other embodiments, the image quality and data storage metrics may be generated for each document type received when it is received. Image quality metrics include reviewing the requirements of images, keyed portions of the image, paper document scan confidence, exception processing of the image, and the image format. Furthermore, the system application 237 may also run data storage metrics on the documents. In this way, the system application 237 may review storage space requirements for storing the image and/or the paper document, the importance of the document, and any regulatory storage requirements.

In some embodiments, the system application 237 may receive and implement entity defined and alternative criteria on the documents. Entity defined criteria are inputted criteria from the financial institution that requires retention or destruction of documents based on the input being triggered by the document. The entity criteria may determine one or more documents that may be deleted or destroyed based on regulations, entity requirements, or the like. Furthermore, alternative defined criteria may be reviewed to trigger a retention or destruction of one or more documents. Alternative criteria may include the geographic location that the paper document may be stored, the financial institution branch that received the paper document, the likelihood of natural disasters at the location, or the like.

Based on the image quality metrics, data storage metrics, entity defined criteria, and the alternative criteria the system application 237 may identify and determine a triggering of retention or destruction of the paper document associated with the generated image is made.

Furthermore, the system application 237 may identify purged and/or destroyed documents. In this way, the system application 237 may identify one or more documents that were determined to be purged and destroyed from the system application 237. The system application 237 may compile data points form the metrics and criteria for the purged document. As such, any metrics and criteria that were identified for the purged document may be compiled, such any confidence ratings, exceptions, keyed portions, image formats, storage requirements, document importance parameters, and/or regulation requirements.

In some embodiments, the system application 237 may compile monitoring metadata from the retention period of the purged documents. The data points and monitoring metadata are reviewed for feedback loop revisions in the retention parameters. As such, any changes in the initial retention that may have been determined during the retention period may be used to adjust the retention period for future documents. The review may aid in enhancing the retention parameter determination with data from the purged documents. The enhancing of the retention parameters include the feedback loop revisions generated from above.

Next, the system application 237 creates a direct feedback loop for communication and integration of enhancement into metrics and criteria for retention parameter determination. The direct feedback loop generates a communicable link for communicating the enhancements and integration of the enhancements into the metrics and criteria. Finally, the system application 237 revises the retention periods of the documents based on enhancements.

FIG. 2 illustrates a high level process for archive validation with data purge triggering process 100, in accordance with some embodiments of the invention. As illustrated in block 110, the process 100 is initiated by receiving a paper document and generating an image of a document. In some embodiments, the image of the document may be received by an apparatus (e.g. a computer system) via a user's mobile device, a camera, an Automated Teller Machine (ATM) at one of the entity's facilities, a second apparatus at a teller's station, or the like. Furthermore, a document may be received within a batch of documents from one or more other financial institutions or the like.

As illustrated in block 120 the system may process the image of the document to collect image data associated with the paper document. After the successful retrieval or capture of the image of the document, the system may process an image of the document. The system may capture individual pieces of document information from the image of the document. In some embodiments, the document information may be text. In other embodiments, the document information may be an image.

Next, as illustrated in block 130, the process continues by running image quality and data storage metrics on the generated image data associated with the document. Image quality metrics may include reviewing the amount of image review and keying required during image processing of the paper document, the image confidence, if any exceptions were flagged during processing, the image format, and the like. Data storage metrics include the storage space required for the image and paper documents, the legal or regulation requirement for document storage, and document importance. Furthermore, the system may also review the document, imaged form and paper form for satisfying criteria, including entity defined criteria and alternative defined criteria for the storage of paper documents and the duration of that retention.

Next, as illustrated in block 140, the process 100 continues by determining retention parameters for the paper documents. In some embodiments, the retention parameters are for storage and retention of paper documents. In some embodiments, the retention parameters are for storage and retention of image data and/or generated image documents. In some embodiments, the retention parameters are for storage and retention of paper documents and image data. Document retention parameters may include a duration of retention, a resolution of image document retention, a geo-location of paper document retention, a server location for image document retention, a monitoring requirement for the retention, and the like.

Finally, as illustrated in block 150, the process 100 is completed by determining documents or portions of documents for destroy queuing based the metrics and criteria associated with the document and image generation of the document. In some embodiments, if the paper or image documents are not queued for being destroyed, the system may store the collected image information and the paper version of the document. In some embodiments, the image document information may be stored as metadata. In some embodiments, portions or elements of the document may be stored as an image. In some embodiments, the individual pieces of document information may be stored together. In some embodiments, the system may additionally store the original image of the document. In other embodiments, the system may determine a location to store the paper document.

FIG. 3 illustrates an example of an image document 300, in accordance with one embodiment of the present invention. The image of Document 1 300 may comprise an image of the entire document such as a check, a thumbnail version of the image of the document, individual pieces of document information, elements of the document, image lift data, or the like. As one of ordinary skill in the art will appreciate, while Document 1 is being represented in FIG. 3, the document may be any type of document, such as a check or the like. Document 1 300 comprises document information, wherein the document information comprises contact information 305, the payee 310, the memo description 315, the account number, routing number 320 associated with the appropriate user or customer account, the date 325, the check number 330, the amount of the check 335, the signature 340, and/or the like. In some embodiments, the document information may comprise text. In other embodiments, the document information may comprise an image. The user input system 240 may capture an image of Document 1 300 and transmit the image to the system 230 via a network. The system 230 may collect the document information from the image of Document 1 300 and store the check information in the datastore 238. In other embodiments, the system may receive a paper version of Document 1 and scan the document to generate an image of the Document 1. In some embodiments, the pieces of document information may be stored in the datastore 238 individually. In other embodiments, multiple pieces of document information may be stored in the datastore 238 together. In some embodiments, the pieces of document information may be stored in the datastore 238 immediately following the capture of the image of Document 1 300. In other embodiments, the pieces of document information may be stored in the datastore 238 at a predetermined point in time after the image of Document 1 300 has been generated. The entity may reserve the right to determine the point in time in which the document information is stored in the datastore 238. This may be based on the image quality metrics, data storage metrics, and/or criteria associated with the same.

Referring now to FIG. 4, FIG. 4 illustrates an example of an image document 500, in accordance with one embodiment of the present invention. The image of Document 2 500 comprises an image of an entire check, a thumbnail version of the image of the document, individual pieces of document information, or the like. The system 230 may retrieve a paper version of the Document 2 and utilize the pieces of the document information to generate a new image of Document 2 500, if necessary for reconciliation or the like. Document 2 500 may comprise document information, wherein the document information may comprise contact information 505, the payee 510, the memo description 515, the account number and routing number 520 associated with the appropriate user or customer account, the date 525, the check number 530, the amount of the check 535, the signature 540, or the like.

FIG. 5 illustrates a process flow for document receiving and image generation 700, in accordance with one embodiment of the present invention. As illustrated in block 702, the process 700 is initiated by scanning documents and generating an image of the document. The documents may be received in paper format from one or more locations, such as from merchants, users, other financial institutions, financial institution locations, or the like. These documents may be scanned via optical character recognition scanning, image scanning, or the like.

The scan may extract metadata from the documents, as illustrated in block 704. As such, data associated with the document may be scanned and stored as metadata. This data may include signature blocks, account numbers, texts, or the like. The scan may also extract image elements from the document, as illustrated in block 706. In this way, the system pay pull the necessary image elements from the document. Image lift is the process of lifting one or more areas/elements of a document and storing those areas as image files. These may be unique portions of the document, such as a signature or the like.

As illustrated in block 708, the system may store the metadata and the image elements from the document. Next, the scanned documents may then by ran through exception processing. The exception processing may identify exceptions such as missed micro lines, incomplete scans, poor MIRC readings, or the like. The process may generate a confirmation of quality of the scanned document, as illustrated in block 710. The confidence may be determined based on a determination of how many exceptions were identified in the generation of the scanned image. If no exceptions are identified, the confidence may be high or near one hundred percent confidence of the accuracy of the scan. In other embodiments, the more exceptions that are identified, the less confidence the system may have in the scanning process.

Next, as illustrated in block 712, the process 700 continues to run image quality and data storage metrics on the document and the generated image. Image quality metrics and data storage metrics are described further below in FIG. 6. Image quality metrics may include the required review of the scan of the image, the scan confidence, the required key portions, the exception processing, and the format of the image. The data storage metrics may include storage space requirements for the image and paper document, regulation storage requirements, and the like.

Finally, as illustrated in block 714, the process 700 is completed by determining a retention and/or duration of retention for paper and image documents.

FIG. 6 illustrates a process flow presenting metrics and criteria for paper document retention 800, in accordance with one embodiment of the present invention. As illustrated, retention parameters for document retention and destroying is determined based in image quality metrics 802, entity defined criteria 814, alternative defined criteria 815, and data storage metrics 816. These metrics and criteria provide the parameters for determining retention and destroying of paper and/or image documents.

As illustrated, image quality metrics 802 include review requirements of images 804, keyed portions 808, scan confidence 806, exception processing 810, and image form 812. In some embodiments, review requirements of images 804 comprise the manual requirements to review the image scan of the document. As such, in some embodiments, the system may require manual review of the image scan to confirm that the image scan includes the correct information of the financial document scanned. In some embodiments, keyed portions 808 comprise the number of numbers or letters required to be inputted via a manual review of the scanned image. In this way, the document may comprise numbers or letters associated with the document parts. In this way, if not scanned at a high image quality, there may be one or more numbers or letters that may be required to be inputted via a key portion 808. These portions may be keyed manually or by the system to ensure correct numbers and letters associated with the document scan. In some embodiments, scan confidence 806 comprise the confidence that the system may have in the scan completion and the accuracy of the same. In some embodiments, exception processing 810 comprises whether the document underwent exception processing. Exception processing comprises flagging the generated image from the paper document scan as having one or more exceptions associated with the scan. These exceptions may be misread MIRC lines, misprinted numbers, misidentified letters, or the like. In some embodiments, image form 812 comprises determination whether the image is in proper form for image archiving.

As illustrated, block 814 comprises entity defined criteria associated with retention parameter determination. As such, one or more associates of the entity may set criteria for destroying and/or keeping documents, such as paper documents or image documents. The entity associates may be able to determine one or more documents that may be deleted or destroyed based on regulations, entity requirements, or the like.

Alternative defined criteria, illustrated in block 815 may include the geographic location that the paper document may be stored, the financial institution branch that received the paper document, the likelihood of natural disasters at the location, or the like.

As further illustrated in FIG. 6, the system may also compile and review data storage metrics 816 for decision processing of retention of paper documents. Data storage metrics 816 comprise storage space requirements 818, document importance 822, and regulation storage requirements 820.

In some embodiments, storage space requirements 818 comprise a determination of one or more storage space requirements for the document. The storage space requirements may be the physical amount of space required for the storage of the document and/or the memory required to store an electronic version of the document. With a potential for limited storage room, the system may determine a duration of retention based on the availability of storage room for the document.

In some embodiments, document importance 822 comprises a scale of importance of the document to the financial institution and the user. In this way, documents may be classified as important to the user and stored in paper format longer than potentially required or necessary for the financial institution. In some embodiments, regulation storage requirements 820 comprise legal or regulation requirements for a particular document type for retention of paper and/or image documents for a specific duration of time.

FIG. 7 illustrates a decision process flow for paper document retention 600, in accordance with one embodiment of the present invention. As illustrated in block 602, the process 600 is initiated by generating image quality and data storage metrics for retention determination. In some embodiments, the image quality and data storage metrics may be generated prior to document receiving. In other embodiments, the image quality and data storage metrics may be generated for each document type received when it is received.

As illustrated in decision block 604, it is determined that a user has completed a transaction. If the user has not completed a transaction, the process 600 may terminate. If the user has completed a transaction, the process 600 moved to generating image documents associated with documents of the transaction, as illustrated in block 606. In this way, the system may receive a paper version of the documents and convert the documents, via optical character scanning, image lift, or the like into image files. This generation may also include exception processing to determine if any exceptions where preformed during the batching and scanning of the documents into electronic or image form.

Once the documents have been generated into an electronic format, such as an image form or metadata form, the process 600 may continue by running image quality and data storage metrics on the document, as illustrated in block 608. In some embodiments, the image quality and data storage metrics are ran on the paper document. In some embodiments, the image quality and data storage metrics are ran on the generated image and metadata generated from the creating the image document. In some embodiments, the image quality and data storage metrics are ran on both the paper document and the image of the document. Image quality metrics include reviewing the requirements of images, keyed portions of the image, paper document scan confidence, exception processing of the image, and the image format. In some embodiments, review requirements of images comprise determining an amount of manual review needed in order to confirm that the image is a proper scan of the document. Along these lines, the additional requirements of manually keying in portions of the document bot lead to additional retention requirements for the paper document to ensure the accuracy of the scan. Similarly, the scan confidence of the original image lifting and optical character image scan of the paper document may play a role in paper document retention. As such, less confidence that the system has in the completeness and readability of the scan, the system may determine to retain the paper document or portions of the paper document for accuracy and later reconciliation if required. Furthermore, the system may review the exception processing of the image file during the running of the image quality metrics. The system may determine if the image went through the exception processing that comprises flagging the generated image from the paper document scan as having one or more exceptions associated with the scan. These exceptions may be misread MIRC lines, misprinted numbers, misidentified letters, or the like. If exception processing has occurred the system may review the confidence in the correcting of the exception prior to destroying any paper versions of the document. Finally, the system may review the image document to see if it is in a proper format for image archiving. If it is not in the proper format, the system may continue to retain the paper version of the document for later image scanning into a correct format.

Furthermore, the system may also run data storage metrics on the documents. In this way, the system may review storage space requirements for storing the image and/or the paper document, the importance of the document, and any regulatory storage requirements.

Next, as illustrated in block 610, the process continues by running entity defined and alternative criteria on the documents. Entity defined criteria are inputted criteria from the financial institution that requires retention or destruction of documents based on the input being triggered by the document. The entity criteria may determine one or more documents that may be deleted or destroyed based on regulations, entity requirements, or the like. Furthermore, alternative defined criteria may be reviewed to trigger a retention or destruction of one or more documents. Alternative criteria may include the geographic location that the paper document may be stored, the financial institution branch that received the paper document, the likelihood of natural disasters at the location, or the like.

Next, as illustrated in decision block 612, based on the image quality metrics, data storage metrics, entity defined criteria, and the alternative criteria a triggering of retention or destruction of the paper document associated with the generated image is made. In some embodiments, the decision is make to not retain the paper document in block 612, once that decision has been made the system will reconfirm the quality of the image document and data associated therewith, as illustrated in block 620, then proceed to destroy the paper document, as illustrated in block 622.

In some embodiments, the decision is made in block 612 to retain the paper document. In this way, the paper document is stored and the system may continually monitor the paper document to see if anyone has attempted to gain access to the document, as illustrated in block 614. This access information is stored as metadata and may trigger a subsequent deletion of the paper document based on lack of accessing the document. As illustrated in block 616, in some embodiments, the monitoring may lead to an identification that the paper document may need to be continued to be stored and the process will continue back to block 614. In other embodiments, as illustrated in block 618, the monitoring may lead to an identification of factors that trigger a queuing of the document for disposal. Finally, as illustrated in block 622, the paper document may be destroyed.

FIG. 8 illustrates a decision process flow for paper document retention determination and document generation 900, in accordance with one embodiment of the present invention. As illustrated in block 902 the process starts by generating image quality and data storage metrics for retention determination. In some embodiments, the image quality and data storage metrics may be generated prior to document receiving. In other embodiments, the image quality and data storage metrics may be generated for each document type received when it is received.

As illustrated in decision block 904, it is determined that a user has completed a transaction. If the user has not completed a transaction, the process 900 may terminate. If the user has completed a transaction, the process 900 moved to generating image documents associated with documents of the transaction, as illustrated in block 906. In this way, the system may receive a paper version of the documents and convert the documents, via optical character scanning, image lift, or the like into image files. This generation may also include exception processing to determine if any exceptions where preformed during the batching and scanning of the documents into electronic or image form. In this way, image lift may be necessary to pull the necessary image elements from the document. Image lift is the process of lifting one or more areas/elements of a document and storing those areas as image files. These may be unique portions of the document, such as a signature or the like.

Once the documents have been generated into an electronic format, such as an image form or metadata form, the process 900 continues by storing the image data for the paper document, as illustrated in block 908. In some embodiments, the data may be in image format, such as image lift data or the like. In other embodiments, the data may be in a metadata format. In other embodiments, there may be a combination of image data and metadata stored in association with the document.

Next, as illustrated in block 910, the process 900 continues by running image quality and data storage metrics on the document to determine the paper document retention requirements. At this point, the system determines whether a paper document may be retained and for the duration of that retention.

As illustrated in decision block 912 a request for a document is made. The request may be from a user, entity, or the like. If no request is made in decision block 912, the process 900 is terminated. If a request is made in decision block 912, then the system may determine the transaction associated with the requested document, as illustrated in block 914.

As illustrated in block 914, once the transaction is identified, the system may retrieve the stored metadata and image lift data associated with the document of that transaction. The system may then merge the metadata and the image lift data to create system generated image of the transaction document requested, as illustrated in block 916. In this way, while a system generated image of the transaction document is created, the generated image still comprises recognizable characteristics, such as the user's actual signature or the like. In this way, the entity still minimizes storage of high resolution image files, while still providing users with images of transaction documents that are similar to the original document and have recognizable characteristics, such as the user's signature, associated therewith. Finally, in block 918 the system presents the reproduced document using metadata and image lift data to the user based on the user's request.

Alternatively, if the system determined to retain the paper document in block 910, the system may retrieve the paper document associated with the requested transaction document, as illustrated in block 912. Finally, as illustrated in block 918, the system may present the requested transaction document in a paper form as a copy of the retained paper document or in an electric form as a scanned copy of the retained paper document.

FIG. 9 illustrates a process flow for a feedback loop for integration of enhancements into metrics and criteria 1000, in accordance with one embodiment of the present invention. As illustrated in block 1002, the process 1000 is initiated by identifying purged and/or destroyed documents. In this way, the system may identify one or more documents that were determined to be purged and destroyed from the system. In some embodiments, prior to being completely destroyed, the system may identify the documents and compile the data points from the metrics and criteria for the purged document, as illustrated in block 1004.

In this way, as illustrated in block 1004, the system may compile data points form the metrics and criteria for the purged document. As such, any metrics and criteria that were identified for the purged document may be compiled, such any confidence ratings, exceptions, keyed portions, image formats, storage requirements, document importance parameters, and/or regulation requirements.

Next, as illustrated in block 1006, the system may compile monitoring metadata from the retention period of the purged documents. Prior to being destroyed, the document was stored and the system may continually monitor the document to see if anyone has attempted to gain access to the document. This access information is stored as metadata. The monitoring may lead to an identification that the document may need to be continued to be stored. In other embodiments, the monitoring may lead to an identification of factors that trigger a queuing of the document for disposal. The monitoring metadata from the retention period of the now purged document may be compiled and extracted for feedback loop revisions.

As illustrated in block 1008, the data points and monitoring metadata are reviewed for feedback loop revisions in the retention parameters. As such, any changes in the initial retention that may have been determined during the retention period may be used to adjust the retention period for future documents. The review may aid in enhancing the retention parameter determination with data from the purged documents, as illustrated in block 1010. The enhancing of the retention parameters include the feedback loop revisions generated from block 1008.

Next, the process 1000 continues by creating a direct feedback loop for communication and integration of enhancement into metrics and criteria for retention parameter determination, as illustrated in block 1012. The direct feedback loop generates a communicable link for communicating the enhancements and integration of the enhancements into the metrics and criteria.

Finally, as illustrated in block 1014, the system revises the retention periods of the documents based on enhancements.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for feedback loop enhancement of retention parameter determination, the system comprising:
    a memory device with computer-readable program code stored thereon;
    a communication device;
    a processing device operatively coupled to the memory device and the communication device, wherein the processing device is configured to execute the computer-readable program code to:
        receive an indication of a user transaction, wherein receiving an indication of the user transaction comprises receiving transaction documents associated with the user transaction, wherein the transaction documents received are paper transaction documents;
        generate image documents of the transaction documents, wherein generating image documents comprises determining data and elements from the transaction documents;
        store the determined data as text data and store the elements from the transaction documents as image data;
        process the image data through image quality metrics, wherein processing the image data through image quality metrics includes entity defined criteria and alternative defined criteria, wherein entity defined criteria triggers a rule for retention and wherein alternative defined criteria identify a geographic location of storage of the image data that triggers a rule for retention duration;
        process the text data through data storage metrics, wherein data storage metrics include regulatory requirements for storing one or more versions of the text data, wherein processing the text data through data storage metrics includes entity defined criteria and alternative defined criteria, wherein entity defined criteria identify one or more elements that triggers a rule for retention and wherein alternative defined criteria identify a geographic location of storage of the text data that triggers a rule for retention duration;
        trigger a retention parameter for transaction documents associated with the user transaction based on the image quality metrics and the data storage metrics;

continually monitor the transaction documents during retention and generate metadata associated with the transaction documents;

prior to the end of the retention duration, extract the metadata associated with the transaction documents, wherein the metadata comprises storage requirements, document importance parameters, regulation requirements and recorded attempts to gain access to the transaction documents;

purge the transaction document upon termination of the retention;

identify purged transaction documents and compile data points from the image quality metrics and data storage metrics for the purged transaction documents;

determine revisions in retention parameters based on the generated metadata associated with the transaction documents;

adjust retention parameters for future transaction documents based on the revisions in retention parameters; and create direct feedback loop for communicable linkage and integration of revisions in retention parameters into image quality metrics and data storage metrics of currently stored and retained transaction documents.

2. The system of claim 1, further comprising generating enhancements to the retention parameter for feedback looping and integration of enhancements to retention parameter determination.

3. The system of claim 1, wherein image quality metrics comprise identifying exception processing of the image documents, identifying required manual review of the image documents, identifying manually keyed portions of the image documents, and identifying a format of the image documents.

4. The system of claim 1, wherein data storage metrics comprise entity wide storage space available and required for storage of the image documents and importance of the transaction documents to a user and to a financial institution.

5. The system of claim 1, further comprising identifying a duration of current retention parameters being inaccurate for the transaction document and adjusting the duration of the retention parameters for similar documents received at a future time by implementation of the revisions based on the identified inaccurate duration of retention parameters for the transaction document.

6. The system of claim 1, wherein transaction documents comprise one or more of a check, deposit ticket, automated teller machine (ATM) receipt, or general ledger ticket.

7. The system of claim 1, further comprising merging retrieved stored text data and stored image data from the transaction documents together to reproduce the transaction document based on a received request for the transaction documents.

8. A computer program product for feedback loop enhancement of retention parameter determination, the computer program product comprising at least one non-transitory computer-readable medium having computer-readable program code portions embodied therein, the computer-readable program code portions comprising:

an executable portion configured for receiving an indication of a user transaction, wherein receiving an indication of the user transaction comprises receiving transaction documents associated with the user transaction, wherein the transaction documents received are paper transaction documents;

an executable portion configured for generating image documents of the transaction documents, wherein generating image documents comprises determining data and elements from the transaction documents;

an executable portion configured for storing the determined data as text data and storing the elements from the transaction documents as image data;

an executable portion configured for processing the image data through image quality metrics, wherein processing the image data through image quality metrics includes entity defined criteria and alternative defined criteria, wherein entity defined criteria triggers a rule for retention and wherein alternative defined criteria identify a geographic location of storage of the image data that triggers a rule for retention duration;

an executable portion configured for processing the text data through data storage metrics, wherein data storage metrics include regulatory requirements for storing one or more versions of the text data, wherein processing the text data through data storage metrics includes entity defined criteria and alternative defined criteria, wherein entity defined criteria identify one or more elements that triggers a rule for retention and wherein alternative defined criteria identify a geographic location of storage of the text data that triggers a rule for retention duration;

an executable portion configured for triggering a retention parameter for transaction documents associated with the user transaction based on the image quality metrics and the data storage metrics;

an executable portion configured for continually monitoring the transaction documents during retention and generate metadata associated with the transaction documents;

an executable portion configured for, prior to the end of the retention duration, extracting the metadata associated with the transaction documents, wherein the metadata comprises storage requirements, document importance parameters, regulation requirements and recorded attempts to gain access to the transaction documents;

an executable portion configured for purging the transaction document upon termination of the retention;

an executable portion configured for identifying purged transaction documents and compile data points from the image quality metrics and data storage metrics for the purged transaction documents;

an executable portion configured for determining revisions in retention parameters based on the generated metadata associated with the transaction documents;

an executable portion configured for adjusting retention parameters for future transaction documents based on the revisions in retention parameters; and an executable portion configured for creating direct feedback loop for communicable linkage and integration of revisions in retention parameters into image quality metrics and data storage metrics of currently stored and retained transaction documents.

9. The computer program product of claim 8, further comprising an executable portion for generating enhancements to the retention parameter for feedback looping and integration of enhancements to retention parameter determination.

10. The computer program product of claim 8, wherein image quality metrics comprise identifying exception processing of the image documents, identifying required manual review of the image documents, identifying manually keyed portions of the image documents, and identifying a format of the image documents.

11. The computer program product of claim 8, wherein data storage metrics comprise entity wide storage space available and required for storage of the image documents and importance of the transaction documents to a user and to a financial institution.

12. The computer program product of claim 8, further comprising an executable portion configured for identifying a duration of current retention parameters being inaccurate for the transaction document and adjusting the duration of the retention parameters for similar documents received at a future time by implementation of the revisions based on the identified inaccurate duration of retention parameters for the transaction document.

13. The computer program product of claim 8, wherein transaction documents comprise one or more of a check, deposit ticket, automated teller machine (ATM) receipt, or general ledger ticket.

14. The computer program product of claim 8, further comprising an executable portion configured for merging retrieved stored text data and stored image data from the transaction documents together to reproduce the transaction document based on a received request for the transaction documents.

15. A computer-implemented method for feedback loop enhancement of retention parameter determination, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
receiving an indication of a user transaction, wherein receiving an indication of the user transaction comprises receiving transaction documents associated with the user transaction, wherein the transaction documents received are paper transaction documents;
generating image documents of the transaction documents, wherein generating image documents comprises determining data and elements from the transaction documents;
storing the determined data as text data and storing the elements from the transaction documents as image data;
processing the image data through image quality metrics, wherein processing the image data through image quality metrics includes entity defined criteria and alternative defined criteria, wherein entity defined criteria triggers a rule for retention and wherein alternative defined criteria identify a geographic location of storage of the image data that triggers a rule for retention duration;
processing the text data through data storage metrics, wherein data storage metrics include regulatory requirements for storing one or more versions of the text data, wherein processing the text data through data storage metrics includes entity defined criteria and alternative defined criteria, wherein entity defined criteria identify one or more elements that triggers a rule for retention and wherein alternative defined criteria identify a geographic location of storage of the text data that triggers a rule for retention duration;
triggering a retention parameter for transaction documents associated with the user transaction based on the image quality metrics and the data storage metrics;
continually monitoring the transaction documents during retention and generate metadata associated with the transaction documents;
prior to the end of the retention duration, extracting the metadata associated with the transaction documents, wherein the metadata comprises storage requirements, document importance parameters, regulation requirements and recorded attempts to gain access to the transaction documents;
purging the transaction document upon termination of the retention;
identifying purged transaction documents and compile data points from the image quality metrics and data storage metrics for the purged transaction documents;
determining revisions in retention parameters based on the generated metadata associated with the transaction documents;
adjusting retention parameters for future transaction documents based on the revisions in retention parameters; and
creating direct feedback loop for communicable linkage and integration of revisions in retention parameters into image quality metrics and data storage metrics of currently stored and retained transaction documents.

16. The computer-implemented method of claim 15, further comprising generating enhancements to the retention parameter for feedback looping and integration of enhancements to retention parameter determination.

17. The computer-implemented method of claim 15, wherein image quality metrics comprise identifying exception processing of the image documents, identifying required manual review of the image documents, identifying manually keyed portions of the image documents, and identifying a format of the image documents and wherein data storage metrics comprise entity wide storage space available and required for storage of the image documents and importance of the transaction documents to a user and to a financial institution.

18. The computer-implemented method of claim 15, further comprising identifying a duration of current retention parameters being inaccurate for the transaction document and adjusting the duration of the retention parameters for similar documents received at a future time by implementation of the revisions based on the identified inaccurate duration of retention parameters for the transaction document.

* * * * *